April 23, 1968     C. R. SCHUH ET AL     3,379,219
ELEVATOR SPOUT CONSTRUCTION AND METHOD OF MAKING SAME
Filed July 6, 1965
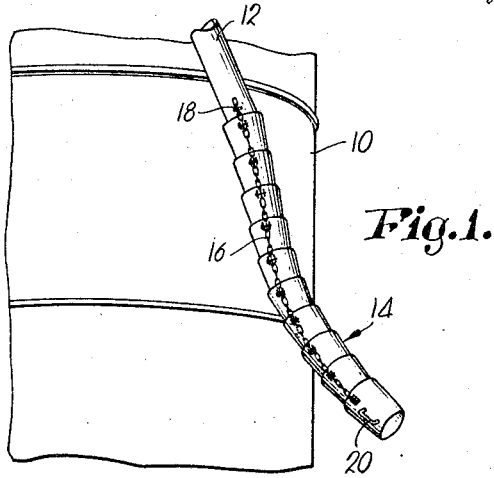
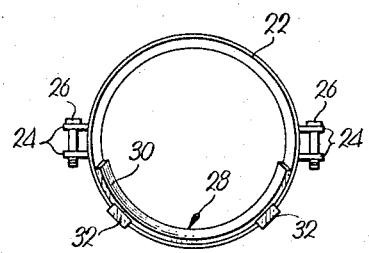
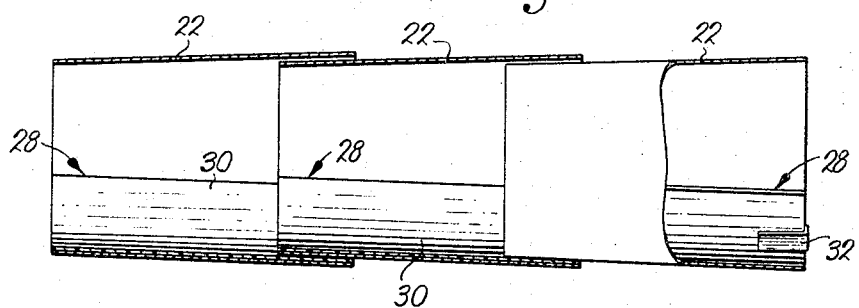
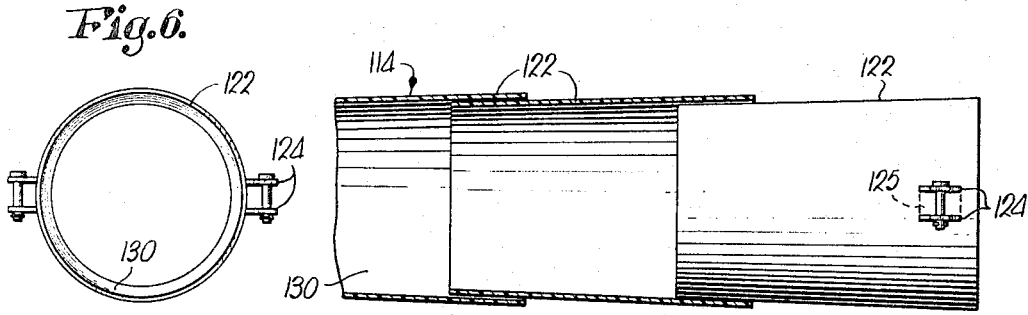
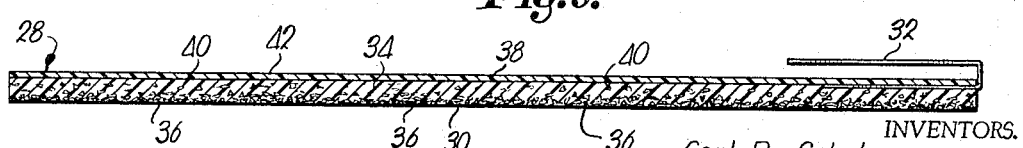
INVENTORS.
Carl R. Schuh
John W. Lamoreaux
BY
*Hovey, Schmidt, Johnson & Hovey*
ATTORNEYS.

United States Patent Office 3,379,219
Patented Apr. 23, 1968

3,379,219
ELEVATOR SPOUT CONSTRUCTION AND
METHOD OF MAKING SAME
Carl R. Schuh and John W. Lamoreaux, both of
Waterville, Kans. 66548
Filed July 6, 1965, Ser. No. 469,948
6 Claims. (Cl. 138—118)

ABSTRACT OF THE DISCLOSURE

A grain bin is provided with a discharge tube having a sectionalized spout at the lower end thereof. According to one form of the invention, each spout section is protected against wear by a liner comprising a synthetic resin binder impregnated with an abrasion resistant, granulated substance such as flint, black granite, silicon carbide or sand. The granules of the substance are disposed adjacent the inner surface of the liner in proximal relationship to one another, and the density of the substance progressively increases as such surface is approached. A fiber glass sheet is bonded to the binder during curing in order to provide increased structural strength.

In a second form of the invention, the entire spout section is constructed of the same materials as discussed above for the liner. A tubular configuration is imparted to the structure after partial curing of the binder, and the density of the granules is the greatest at the internal surface over which the grain flows during discharge from the bin.

---

This invention relates to a material conveying conduit construction which is capable of withstanding the frictional forces produced by the moving material without abrading and, more specifically, to an improved spout for use in unloading grain from a storage bin or elevator at a high rate of flow.

It has been common practice for a number of years to store grain in large storage bins or elevators after harvest but prior to shipment of the grain to processors. The development of large storage facilities has, however, brought about the problem of handling the grain during transfer from the bin to railway cars or the like.

In present day storage installations, the grain is discharged from the bin through a discharge tube, often after weighing thereof or transfer of the grain from the bin to a central dispensing location. Due to the height of the storage bins, it will be appreciated that the grain often gravitates a considerable distance in its flow through the tube toward the boxcar being loaded. At the lower end of the tube adjacent the car, it is necessary to provide a sectionalized spout which may be adjustably positioned to direct the grain into the car, much in the same manner as a flexible conduit or hose. Thus, the grain is traveling at its maximum speed at the time it enters the spout, thereby subjecting the latter to maximum frictional forces as the grain passes over the internal surfaces of the spout and into the car.

In the prior art, considerable difficulty has been experienced with abrading of the spout, particularly with hard grains such as corn, soybeans and milo. In spouts constructed of steel sections the average life of the spout is approximately eight train cars before replacement is necessary due to perforation of the walls thereof. The life of steel spouts can be increased by coating the internal surface with porcelain, but even this construction wears through after approximately twelve cars are loaded.

It is, therefore, the primary object of this invention to provide a conduit construction for conveying particulate material which will not be substantially abraded by the frictional forces produced by the material during passage thereof through the conduit.

As a corollary to the above object, it is also an important aim of this invention to provide a structural member for a conduit which presents a smooth, material-receiving surface and which has sufficient hardness to prevent substantial abrasion thereof by the material as the latter traverses said surface.

Another object of the instant invention is to provide a liner for reinforcing a conventional elevator spout which will eliminate the above-discussed replacement problem.

Still another object of this invention is to provide a spout liner as aforesaid of sufficient hardness to effectively resist abrasive forces applied to the liner by the moving grain.

A further object of the invention is to provide a tubular element for a sectionalized elevator spout composed of a substance having the aforesaid abrasion resistant property to the end that the spout will be capable of continuous use without substantial wear, in contrast to the steel or porcelain coated steel spouts discussed above.

An additional object of the instant invention is to provide a method of making the spout liner or the tubular spout element to assure that the same have the requisite abrasion resistant property.

Other objects will become apparent as the detailed description proceeds.

In the drawing:

FIGURE 1 is a perspective view showing a portion of a grain storage bin and the instant invention connected to the end of the discharge tube;

FIG. 2 is a diagrammatic, sectional view of the liner illustrating the composition thereof;

FIG. 3 is a view partially in section and partially in elevation showing the liner of the instant invention in place within steel spout sections;

FIG. 4 is an end view of one of the sections shown in FIG. 3;

FIG. 5 is a view partially in section and partially in elevation showing spout sections composed of the composition of the instant invention; and FIG. 6 is an end view of one of the sections shown in FIG. 5.

In FIG. 1 a grain bin is shown fragmentarily at 10, the bin being provided with a discharge tube 12 coupled with a sectionalized spout 14 at the lower end thereof. The various sections of spout 14 are of frusto-conical configuration and are held together by a chain 16 having its upper end attached to tube 12 at 18. A handle 20 may be provided on the lowermost spout section to assist in manipulating the same to direct grain into a boxcar or the like (not shown).

Referring to FIGS. 3 and 4, spout 14 is there shown as comprising tubular, frusto-conical steel elements or sections 22. Opposed pairs of lugs 24 receive crossbolts 26 and serve as a means of attaching each section to chain 16. Manifestly, if a single chain is utilized, only one set of lugs 24 is actually used in securing the section to the chain.

A relatively thin, arcuate liner 28 of the instant invention is disposed within each section 22 in overlying, complemental relationship to approximately one-half of the section wall. Each liner 28 has an internally facing, smooth surface 30 which receives the grain as the same flows through the spout. A pair of bendable tabs 32 project from one arcuate edge of liner 28 and hook over the open end of the spout section to maintain the liner in place.

The composition of liner 28 is illustrated in FIG. 2. A binder 34 comprising a cured, thermosetting synthetic resin of the polyester or epoxy type is impregnated with a hard, granulated substance which is distributed throughout the binder. It should be noted that the granules 36 of the substance adjacent surface 30 are disposed in proximal, substantially coplanar relationship to one another. The illustration of liner 28 in FIG. 2 with surface 30 facing downwardly depicts the orientation of the liner during fabrication thereof by a method to be subsequently discussed.

As seen in FIG. 2, a fibrous sheet 38 comprising a fiber glass cloth or mat overlies binder 34 and is bonded thereto during the curing process. It may be noted that the density of the granulated substance adjacent sheet 38, as illustrated by granules 40, is less than the density of the substance adjacent surface 30, as shown by granules 36. Thus, the density of the substance is progressively greater as surface 30 is approached.

It will be appreciated that sheet 38 presents an outer surface 42 in parallelism with surface 30, surface 42 being in engagement with the wall of section 22 when the liner is mounted therein. Tab 32 is U-shaped in configuration, one of the legs thereof being sandwiched between binder 34 and sheet 38.

Attention is now directed to an alternative form of the invention shown in FIGS. 5 and 6. Spout 114 comprises sections 122 constructed of the same materials as shown in FIG. 2 for liner 28. In this form of the invention the conventional steel section is no longer utilized. With an exception to be noted hereinafter when the method of forming sections 122 is discussed, the entire frusto-conical inner surface 130 of each section 122 is available for receiving the flowing grain.

Liner 28 is fabricated by mixing the synthetic resin with the granulated substance and a suitable catalyst such as methyl ethyl ketone peroxide. Before the catalyst begins to develop sufficient heat to effect curing of the resin, the mixture is poured onto a smooth surface within the confines of a rectangular form. The use of waxed paper underlying the form assists in providing a smooth surface for supporting the mixture. The mixture is then rolled or kneaded as required to fill the form. During this time and while the mixture lies stationary in the form, the granulated substance begins to settle to the bottom of the form and concentrates adjacent the underlying surface. In this manner, the desired high density of the substance at what will become surface 30 after curing is obtained, and the granules 36 adjacent the surface are permitted to settle into substantially coplanar relationship as illustrated in FIG. 2.

Immediately after rolling of the mixture to fill the form, the fiber glass sheet 38 is placed in overlying relationship to the mixture with tabs 32 partially embedded in the binder. Although either a fiber glass cloth or mat may be utilized, a mat having a weight of one ounce per square foot is preferred. In this manner, upon curing of the binder, sheet 38 forms a backing for the liner to increase the structural strength thereof during usage and eliminate the danger of breakage in handling.

After the binder has reached the gel stage due to partial curing thereof by the action of the catalyst, the liner is removed from the form and placed over an arcuate mandrel with surface 30 facing downwardly and engaging the mandrel surface. It is important that transfer of the liner from the form to the mandrel be effected only after partial curing of the binder has occurred, since the granulated substance must not be permitted to shift within the binder and disturb the arrangement of granules 36. It will be appreciated that granules 36 form the surface 30 in cooperation with the binder which securely maintains the granules in the closely spaced, substantially coplanar relationship attained during settling of the granules in the binder prior to commencement of curing.

To assist in increasing the density of the granulated substance adjacent surface 30, the mixture may be vibrated while in the form to assist in the settling action. Additionally, to increase the speed of the fabrication process, complete curing may be accelerated by placing the mandrel and the liner in an oven.

The selection of the granulated substance which is mixed with the binder is important to the effectiveness of the instant invention in resisting abrasion. A hard mineral substance granulated to form particles of proper size is utilized, preferably No. 3 mesh flint (known as Joplin chat), 00 black granite, or silicon carbide (sold under the trademark Carborundum). Also, sand or marble may be employed.

The fabrication of the alternative form of the invention shown in FIGS. 5 and 6 is similar to that as set forth above for liner 28. Manifestly, the form into which the mixture is placed must be configured so that a frusto-conical section will be formed when the material is placed on a frusto-conical mandrel. Additionally, the abutting, longitudinal edges of the material should be secured together, such as by placing an additional fiber glass mat in overlying relationship to the abutting edges after the section is shaped on the mandrel. The lugs 124 which attach each section to the chain are formed by a U-shaped component 125, the bight thereof being sandwiched between the fiber glass backing and the binder to secure lugs 124 to the section.

It will be appreciated that the abutting, longitudinal edges of the frusto-conical section form a line of weakness in the material. Therefore, lugs 124 are located so that the sections 122 will be held by the interconnecting chain with their lines of weakness extending along the uppermost portion of the spout. In this manner, the lines of weakness will not be subjected to the gravitating grain.

Having thus described the invention, what is claimed as new and desired to be secured by Letters Patent is:

1. A flexible grain conduit for use with grain handling apparatus for conveying grain from a bin to a point of delivery,
said conduit being provided with a member having a hard, smooth, grain-receiving surface and comprising a synthetic resin binder impregnated with a granular substance having granules thereof disposed adjacent said surface in proximal relationship to one another,
said substance being of sufficient hardness to prevent substantial abrasion thereof by frictional forces produced by the grain as the latter traverses said surface during flow through the conduit.

2. The invention of claim 1,
said binder being homogeneous and said granules being distributed therein with each granule in intimate contact with the binder and with the density of said substance progressively increasing as said surface is approached.

3. The invention of claim 2,
said member having a second surface disposed in opposed relationship to said grain-receiving surface, and a fibrous sheet bonded to said binder and presenting said second surface.

4. The invention of claim 1,
said conduit including a tubular element having a grain-carrying wall portion,
said member overlying said portion to present a liner for the element and being disposed with said surface facing inwardly of the element.

5. The invention of claim 4,
said element having a pair of opposed, open ends,
said member having a fibrous sheet bonded to said binder and disposed between said substance and said portion,
there being a tab projecting from said binder and anchored therein between said sheet and said substance and hooked over one of said ends, whereby to attach the member to the element.

6. The invention of claim 1,
said member having a tubular configuration with said surface being disposed internally of the member, the density of said substance progressively increasing in inward radial directions as said surface is approached.

References Cited

UNITED STATES PATENTS

| | | | |
|---|---|---|---|
| 785,176 | 3/1905 | Mommertz | 306—64 X |
| 1,476,830 | 12/1923 | Newell | 138—120 |
| 1,710,577 | 4/1929 | Hahn | 138—147 |
| 1,981,413 | 11/1934 | Goodfellow | 138—120 X |
| 2,712,987 | 7/1955 | Storrs et al. | 156—279 X |
| 3,151,015 | 9/1964 | Griffith | 308—238 X |

FOREIGN PATENTS 702,385  2/1941  Germany.

LAVERNE D. GEIGER, *Primary Examiner.*

C. L. HOUCK, *Assistant Examiner.*